US009481390B2

(12) United States Patent
Martinez et al.

(10) Patent No.: US 9,481,390 B2
(45) Date of Patent: Nov. 1, 2016

(54) COLLAPSIBLE STEERING COLUMN ASSEMBLY

(71) Applicant: NSK AMERICAS, INC., Ann Arbor, MI (US)

(72) Inventors: Victor Corona Martinez, Ann Arbor, MI (US); David Ray Hartman, Brighton, MI (US)

(73) Assignee: NSK Americas, Inc., Ann Arbor, MI (US)

( * ) Notice: Subject to any disclaimer, the term of this patent is extended or adjusted under 35 U.S.C. 154(b) by 0 days.

(21) Appl. No.: 14/505,853

(22) Filed: Oct. 3, 2014

(65) Prior Publication Data

US 2015/0096404 A1    Apr. 9, 2015

Related U.S. Application Data

(60) Provisional application No. 62/040,092, filed on Aug. 21, 2014, provisional application No. 61/888,323, filed on Oct. 8, 2013, provisional application No. 61/886,788, filed on Oct. 4, 2013.

(51) Int. Cl.
*B62D 1/19*     (2006.01)
*B62D 1/184*    (2006.01)
*B62D 1/18*     (2006.01)

(52) U.S. Cl.
CPC ............... *B62D 1/195* (2013.01); *B62D 1/18* (2013.01); *B62D 1/184* (2013.01); *B62D 1/19* (2013.01)

(58) Field of Classification Search
CPC .......... B62D 1/18; B62D 1/184; B62D 1/19; B62D 1/195
See application file for complete search history.

(56) References Cited

U.S. PATENT DOCUMENTS 4,732,050 A * 3/1988 Vollmer ............... B62D 1/184
                                                280/775
4,785,684 A   11/1988 Nishikawa et al.
5,090,730 A    2/1992 DuRocher et al.
5,477,744 A   12/1995 Hoblingre et al.
5,520,416 A    5/1996 Singer et al.
5,547,221 A    8/1996 Tomaru et al.
5,690,362 A   11/1997 Peitsmeier et al.
(Continued)

FOREIGN PATENT DOCUMENTS

CA     1130701 A1    8/1982
DE    19820043 C2    3/1999
(Continued)

OTHER PUBLICATIONS

International Search Report and Written Opinion, PCT/US2014/059016, dated Jan. 5, 2015.
(Continued)

*Primary Examiner* — Barry Gooden, Jr.
(74) *Attorney, Agent, or Firm* — The Dobrusin Law Firm, P.C.

(57) ABSTRACT

A collapsing steering column assembly for an automotive vehicle, comprising an inner column tube, a steering shaft, a tilt bracket, and a steering wheel adjustment subassembly. During a secondary impact, at least a portion of the steering wheel adjustment subassembly is adapted to detach relative to the tilt bracket by way of at least one breakaway structure and translate (e.g., at least partially longitudinally) during the impact, such as a secondary impact, for moving away from a vehicle operator.

20 Claims, 7 Drawing Sheets

(56) References Cited

U.S. PATENT DOCUMENTS

| | | | |
|---|---|---|---|
| 5,961,146 A | 10/1999 | Matsumoto et al. | |
| 6,224,104 B1 | 5/2001 | Hibino | |
| 6,264,239 B1 | 7/2001 | Link | |
| 6,378,903 B1* | 4/2002 | Yabutsuka | B62D 1/195 188/371 |
| 6,394,241 B1 | 5/2002 | Desjardins et al. | |
| 6,419,269 B1* | 7/2002 | Manwaring | B62D 1/195 280/775 |
| 6,467,807 B2 | 10/2002 | Ikeda et al. | |
| 6,685,225 B2 | 2/2004 | Hancock et al. | |
| 7,198,296 B2 | 4/2007 | Sadakata et al. | |
| 7,228,755 B2 | 6/2007 | Armstrong et al. | |
| 7,258,365 B2 | 8/2007 | Kahlenberg et al. | |
| 7,264,274 B2 | 9/2007 | Ridgway et al. | |
| 7,275,765 B2 | 10/2007 | Camp et al. | |
| 7,322,610 B2 | 1/2008 | Ishida et al. | |
| 7,332,610 B2 | 2/2008 | Han et al. | |
| 7,350,816 B2 | 4/2008 | Ishida et al. | |
| 7,410,190 B2 | 8/2008 | Sawada et al. | |
| 7,422,239 B2 | 9/2008 | Ishibashi et al. | |
| 7,441,807 B2 | 10/2008 | Yoshimoto et al. | |
| 8,047,096 B2 | 11/2011 | Ridgway et al. | |
| 2002/0124677 A1 | 9/2002 | Tomaru et al. | |
| 2005/0093284 A1* | 5/2005 | Sato | B62D 1/195 280/777 |
| 2005/0167962 A1* | 8/2005 | Sato | B62D 1/184 280/775 |
| 2006/0191368 A1 | 8/2006 | Sawada et al. | |
| 2006/0243084 A1* | 11/2006 | Osawa | B62D 1/184 74/484 R |
| 2006/0266151 A1 | 11/2006 | Avers et al. | |
| 2007/0068311 A1 | 3/2007 | Shimoda et al. | |
| 2007/0137381 A1 | 6/2007 | Arihara | |
| 2008/0111363 A1 | 5/2008 | Menjak et al. | |
| 2008/0156138 A1 | 7/2008 | Tomaru et al. | |
| 2008/0224459 A1* | 9/2008 | Oh | B62D 1/195 280/777 |
| 2008/0236325 A1 | 10/2008 | Ridgway et al. | |
| 2009/0174177 A1 | 7/2009 | Gerzseny et al. | |
| 2010/0032933 A1 | 2/2010 | Cymbal et al. | |
| 2010/0300238 A1 | 12/2010 | Ridgway et al. | |
| 2011/0036198 A1* | 2/2011 | Minamigata | B62D 1/184 74/493 |
| 2011/0314954 A1 | 12/2011 | Matsuno et al. | |
| 2013/0118290 A1 | 5/2013 | Burns et al. | |
| 2013/0233117 A1 | 9/2013 | Read et al. | |
| 2014/0182409 A1* | 7/2014 | Nagase | B62D 1/18 74/493 |
| 2014/0196564 A1* | 7/2014 | Bang | B62D 1/187 74/493 |
| 2014/0251061 A1* | 9/2014 | Moriyama | B62D 1/184 74/493 |
| 2014/0260762 A1* | 9/2014 | Streng | B62D 1/195 74/493 |
| 2014/0260763 A1* | 9/2014 | Buzzard | B62D 1/184 74/493 |
| 2014/0312603 A1* | 10/2014 | Hong | B62D 1/195 280/777 |
| 2014/0327235 A1* | 11/2014 | Kwon | B62D 1/195 280/777 |
| 2015/0251684 A1* | 9/2015 | Chiba | B62D 1/195 74/493 |

FOREIGN PATENT DOCUMENTS

| | | |
|---|---|---|
| EP | 0705754 A1 | 4/1996 |
| EP | 1520768 A1 | 4/2005 |
| EP | 1555188 A1 | 7/2005 |
| EP | 1693279 A1 | 8/2006 |
| EP | 2465751 A1 | 6/2012 |
| JP | 7-47961 A | 2/1995 |
| JP | 8-67257 A | 3/1996 |
| JP | 8-175401 A | 7/1996 |
| JP | 11-129915 A | 5/1999 |
| JP | 2001-233223 A | 8/2001 |
| JP | 2002-59853 A | 2/2002 |
| JP | 4613402 B2 | 1/2011 |
| JP | 4635777 B2 | 2/2011 |

OTHER PUBLICATIONS

International Search Report and Written Opinion, PCT/US2013/029761, dated Apr. 3, 2014.

Co-pending International Application, PCT/US2013/029761, filed Mar. 8, 2013.

International Preliminary Report on Patentability, PCT/US2013/029761, dated Aug. 1, 2014.

* cited by examiner

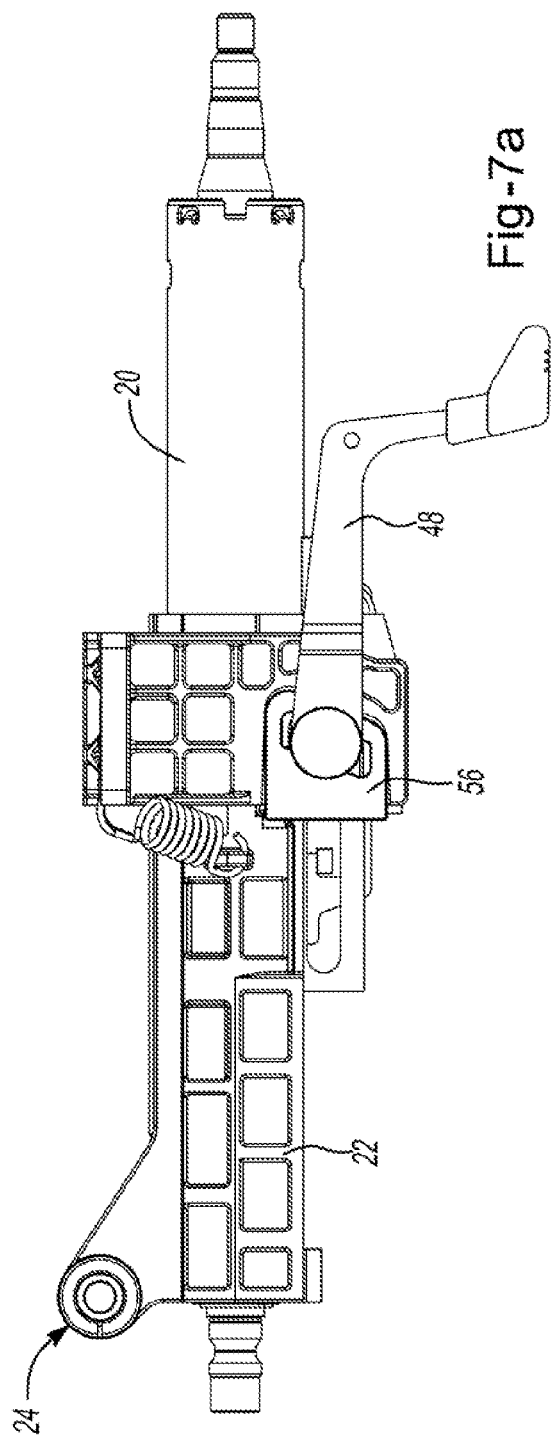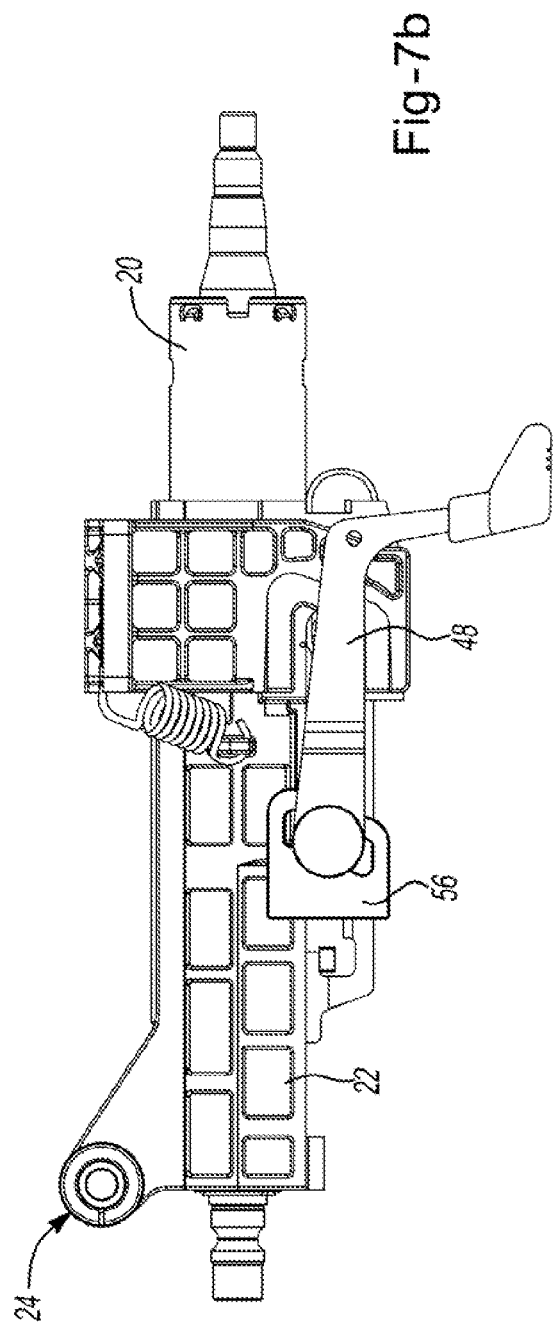

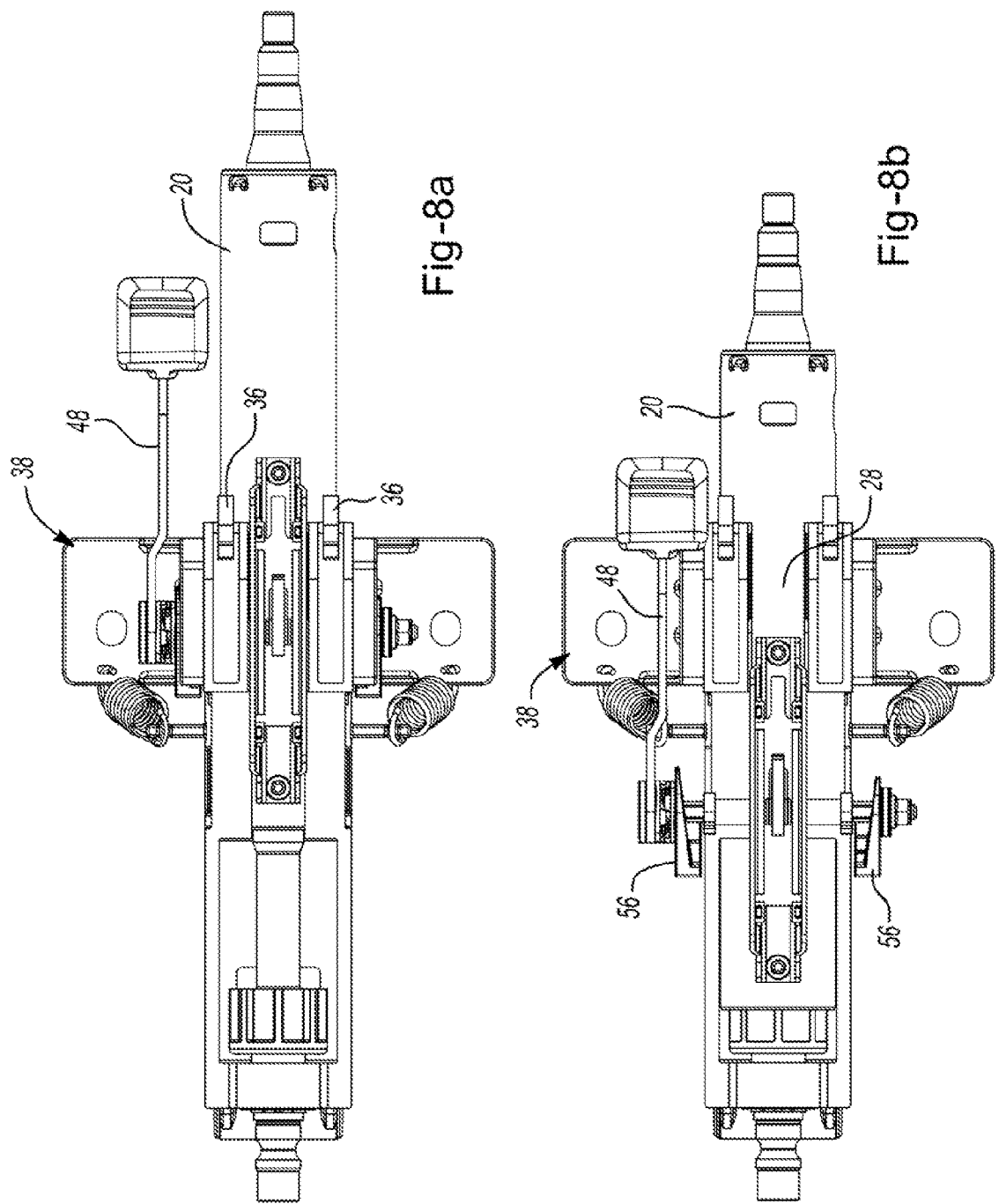

COLLAPSIBLE STEERING COLUMN ASSEMBLY

CLAIM OF PRIORITY

The present application claims the benefit of the filing date of U.S. Patent Application Nos. 61/886,788, filed Oct. 4, 2013; 61/888,323, filed Oct. 8, 2013; and 62/040,092, filed Aug. 21, 2014, all of which are hereby incorporated by reference in their entirety.

FIELD

In general, the present teachings relate to an improved collapsible steering column assembly and methods associated with the same (e.g., methods of providing energy absorption, such as in a secondary impact). More particularly, though having aspects making it adaptable to external collapsing column systems, the present teachings are directed mainly at an internal collapsing tilt and/or telescopically adjustable steering column system.

BACKGROUND

During a vehicle collision, there are commonly two impacts. In a primary impact, the vehicle impacts another object. In a secondary impact, a vehicle occupant impacts a component of the vehicle. For example, a vehicle operator sometimes impacts the steering wheel due to inertia. In order to help try to protect drivers from such secondary impacts, it has become common practice to use an impact-absorbing type steering column. A collapsible steering column system is an example of an impact-absorbing type steering column.

The structure of an impact-absorbing type steering column apparatus is such that when the driver suffers a secondary impact, the impact energy acts on the steering column in the frontward direction of the vehicle. The steering column may detach from one or more fixation points with the vehicle body and move forward (e.g., in a collapse stroke), so that the impact energy is absorbed in the course of the collapse stroke. An external collapsing column assembly is an example of a system in which the entire column will translate relative to its fixation points. An internal collapsing column assembly typically will be fixed at one or more fixation points near one of the ends of the assembly within the vehicle. During a collapse stroke from a secondary impact, components of the assembly will longitudinally collapse (e.g., generally within the volume it occupies within the vehicle in normal operation; that is, generally within its "footprint" in the vehicle), but generally will not collapse beyond a certain distance relative to a predetermined fixation point. An internal collapsing system thus has a stroke, but may remain fixed to the vehicle at the one or more fixation points.

For many applications, steering column assemblies incorporate one or both of a tilt or telescopic function. For these applications, it is common to employ levers for manual performance of such functions by a vehicle user. By way of example, in what is known as a "manual rake and reach" steering column assembly, the assembly will have both a tilt ("rake") and a telescopic ("reach") function, with a lever provided for a vehicle user to manually release for affording rake and reach adjustment to a selected position, and then to re-engage for fixing the steering column in the selected position.

Notwithstanding efforts to improve collapsible steering column assemblies, (e.g., internally collapsible steering column assemblies), there remains a need for alternative assemblies, particularly those in which during an impact such as a secondary impact, one or both of a user operating device (e.g., a lever) and a steering wheel (if employed) may be translated forward and away from a vehicle user.

The following U.S. patent documents may be related to the present invention: Published U.S. Patent Application Nos. 2008/0236325; 2008/0111363; 2009/0174177 2010/0300238; 2010/0032933; and 8,047,096, all of which are incorporated by reference herein for all purposes. Published U.S. Application No. 2013/0233117 also may have teachings related to the present invention and is incorporated by reference herein.

SUMMARY

The present teachings make use of a simple, yet elegant, construction approach by which relatively few components can be employed for achieving an energy absorbing steering column assembly, such as a collapsible steering column assembly. The steering column assembly may be an adjustable (e.g., for rake and/or reach) steering column assembly. For example, though having applicability to externally collapsing assemblies (which are contemplated within the present teachings), the steering column assembly herein may be an internally collapsible assembly. It may be an assembly that is affixed within a vehicle at one or more fixation points so that upon a secondary impact the steering column assembly resists forward motion substantially beyond (e.g., longer than about 20 mm or 10 mm beyond) the one or more fixation points. It may be a collapsible steering column assembly that exhibits relatively good energy absorption characteristics, especially during a secondary impact. It may be a collapsible steering column assembly that exhibits longitudinal displacement (e.g., forward translation) of an adjustment lever (e.g., a lever for manual adjustment) during a secondary impact.

As one general way of characterizing the present teachings, there is envisioned a collapsing steering column assembly. It may be an internally collapsing assembly or an externally collapsing assembly. Though, it is particularly attractive for an internally collapsing assembly in which at least a portion of the assembly is secured against any substantial forward movement (e.g., less than about 50 mm, 20 mm, or 10 mm) within a vehicle. The steering column assembly may include a steering wheel position adjustment portion (e.g., an arrangement adapted for adjusting the rake and/or reach position of a steering wheel relative to a vehicle operator, such as a telescoping tubular arrangement). It may include a bracket (e.g., a tilt bracket) for at least partially carrying the steering wheel position adjustment portion and attaching the assembly within the vehicle. It may include a securing member (e.g., as discussed elsewhere herein, a tilt bolt or other elongated member, such as one that is adapted for applying a securing force to help maintain a steering column assembly in a desired position) for fixing the position of the steering wheel position adjustment portion (such as by operation of a lever that is adapted to be employed by an operator to apply or remove a securing force). It is envisioned that the assembly may include a breakaway structure associated with the bracket, the securing member or both. For instance the breakaway structure may be configured in a manner such that it can allow disengagement of two or more components relative to each other so that one or more components of the steering wheel adjustment portion translate forward in the event of an impact, such as a secondary impact. It is also envisioned that the assembly may include at least one energy absorption device that is operable to absorb energy in a collapse stroke occasioned in response to a force applied to it due to the secondary impact. For instance, forward travel may result for the securing member as a result of the impact such as a secondary impact and as a result of the above mentioned disengagement; in a collapse stroke, the securing member may thus apply a forward force that directly or indirectly operatively engages the at least one energy absorption device (e.g., a plastically deformable elongated member such as a metal strip or bend plate). It is seen that it is possible that the securing member may be configured relative to the breakaway structure in a manner such that in the event of a secondary impact exceeding a threshold load, at least a portion of the securing member breaks away from a secure engagement position by way of the breakaway structure and allows a portion (e.g., an inner column tube) of the steering wheel adjustment portion to translate forward (e.g., relative to a column housing that may be pivotally mounted and/or may be generally fixed in position to avoid forward travel in a collapse stroke) and simultaneously causes the energy absorption device to deform and thereby absorb energy from the secondary impact. The secure engagement position may be where at least a portion of the steering shaft support structure (e.g., an inner column tube, a column housing, or both) is fixed in a fixed position steering column assembly. The secure engagement position may be the adjusted position selected by the user in an adjustable position steering column assembly.

in one general aspect of the teachings, there is contemplated a collapsing steering column assembly that includes an inner column tube, a steering shaft (adapted for coupling with a steering wheel or other like structure) that is supported for rotation at least in part by the inner column tube and having a longitudinal axis; and a suitable bracket for carrying the inner column tube and attaching the assembly within a vehicle (e.g., to a cross-vehicle structure). The bracket may be coupled with a column housing, such as for securing the column housing in a generally fixed position within the vehicle. The inner column tube may configured to be carried by the column housing (e.g., in a telescoping manner), in one or more fixed positions. For example, the inner column tube may be telescopically adjustable (e.g., by way of a manual adjustment lever) within and/or relative to the column housing. The column housing and the inner column tube each will have a longitudinal axis. Their respective longitudinal axes may be generally aligned (e.g., they may be generally co-axial). The position of the inner column tube relative to the column housing may be fixed by way of a securing member (e.g., a tilt bolt as will be described) that is located in a secure engagement position and applies a force (e.g., a generally transverse force relative to the longitudinal axes of the inner column tube and the column housing) to at least one of the column housing or inner column tube for causing a secure engagement of the inner column tube and the column housing (e.g., a clamped engagement, an interference, interlock, detent or other mechanical engagement). The securing member may be such that in the event of a secondary impact exceeding a threshold load, the securing member breaks away from its secure engagement position and allows the inner column tube to translate (e.g., forward) relative to the column housing. The securing member may be such that, in the event of a secondary impact exceeding a threshold load, as the securing member breaks away from its secure engagement position and allows the inner column tube to translate (e.g., forward) relative to the column housing, it also causes an energy absorption device (e.g., a metal strip) to absorb energy from the secondary impact (e.g., by plastically deforming (with or without elongation, compaction, shear strain, and/or buckling)).

With reference to one illustrative example, as will be seen herein, the present teachings relate to a collapsing steering column assembly (e.g., an internally collapsing steering column assembly) for an automotive vehicle, including an inner column tube; a steering shaft supported for rotation at least in part by the inner column tube and having a longitudinal axis; and a bracket (e.g., a tilt bracket adapted for receiving or otherwise carrying and/or supporting at least a portion of the inner column tube and/or for mounting the steering column assembly within the automotive vehicle). A column housing may be employed for telescopically carrying the inner column tube (e.g., the inner column tube may be configured to be located within the column housing). The column housing and inner column tube may be part of a steering shaft support structure. The column housing may have a portion that is adapted to be pivotally mounted within a vehicle (e.g., in a fixed position, or in a position that allows slight forward travel (e.g., about 20 mm or about 10 mm) of the column housing from a load occasioned by a secondary impact). The bracket (e.g., tilt bracket) may include at least one portion adapted to mount the assembly to a vehicle (e.g., to a cross-vehicle structure), and a portion adapted to carry (directly or indirectly) the inner column tube. For example, the bracket may include an upper wall for attachment to the vehicle and an outwardly projecting wall structure that projects away from the upper wall (and which may be configured to flank the inner column tube and/or afford at least a partial vertical translation of the inner column tube relative to the upper wall). A manually operated steering wheel adjustment subassembly may also be employed. It may be adapted for (i) selectively adjusting the steering shaft in a fore or aft direction generally along the longitudinal axis, (ii) selectively raising or lowering the steering shaft; or (iii) both (i) and (ii). The steering wheel adjustment subassembly typically will include a lever adapted for manually actuating the subassembly, and at least one engagement member that is brought into and out of engagement with the inner column tube for selectively locking the steering shaft into a position (which may be relative to the position of the column housing) desired by a user. It is envisioned that there may be a suitable breakaway mechanism (e.g., at least one breakaway insert, or another suitable structure for causing disengagement of the inner column tube from a fixed position selected by the user so that it can travel forward relative to the tilt bracket) that detachably mounts the steering wheel adjustment subassembly relative to the tilt bracket. A fastener assembly may operatively connect the lever, the engagement member, and the at least one breakaway mechanism. The column housing may be pivotally mounted at a pivot mounting location within the automotive vehicle. The column housing may at least partially surround the inner column tube. The column housing may be in clamping relation with the inner column tube so as to permit steering shaft adjustment by way of the steering wheel adjustment subassembly. The column housing, the tilt bracket, and/or the inner column tube may thus include a structure adapted for clamping the column tube into position using the lever. Desirably, during a secondary impact, the column housing remains in a generally fixed position relative to the pivot mounting location (e.g., if it travels longitudinally it travels less than about 20 mm or 10 mm); and (a) at least a portion of the steering wheel adjustment subassembly detaches from or otherwise becomes displaced relative to the tilt bracket by way of the at least one breakaway insert and translates longitudinally during the, secondary impact for moving the lever away from the user; and/or (b) upon longitudinal translation of the at least one breakaway insert, the inner column tube becomes undamped relative to the column housing, the tilt bracket, or both.

By way of summary, in yet one additional illustrative example, the teachings herein contemplate an internally collapsing steering column assembly for an automotive vehicle, comprising: a.) an inner column tube; b). a steering shaft supported for rotation at least in part by the inner column tube and having a longitudinal axis; c.) a tilt bracket adapted for receiving at least a portion of the inner column tube and for mounting the steering column assembly within the automotive vehicle, the tilt bracket including a wall structure that at least partially flanks the inner column tube (e.g., a pair of opposing side walls); d.) a manually operated steering wheel adjustment subassembly adapted for: (i) selectively adjusting the steering shaft in a fore or aft direction generally along the longitudinal axis, (ii) selectively raising or lowering the steering shaft; or (iii) both (i) and (ii). The steering wheel adjustment subassembly includes a lever adapted for manually actuating the subassembly, at least one engagement member that is brought into and out of engagement with the inner column tube for selectively locking the steering shaft into a position desired by a user (e.g., fore or aft), at least one breakaway insert that detachably mounts the steering wheel adjustment subassembly relative to the tilt bracket (e.g., directly to the tilt bracket), and a fastener assembly (such as one that includes at least one fastener such as a tilt bolt) that operatively connects the lever, the engagement member and the breakaway insert. A column housing is pivotally mounted at a pivot mounting location within the automotive vehicle and at least partially surrounds the inner column tube in a relation that may be adapted for clamping or unclamping with the inner column tube (e.g., when the lever is in a predetermined position) so as to permit steering shaft tilt adjustment by way of the steering wheel adjustment subassembly. The column housing may include a suitable structure for releasably clamping or otherwise engaging the inner column tube into position. For instance, it may include an elongated longitudinally oriented opening that defines an inner surface structure that may include opposing inner surfaces (e.g., wall surfaces) that can be urged toward the inner column tube for clamping the inner column tube into position, e.g., by using the lever to apply a damping force, such as by way of the tilt bracket. During an impact such as a secondary impact, the column housing remains in a generally fixed position relative to the pivot mounting location. Further, at least a portion of the steering wheel adjustment subassembly may be adapted to detach from the tilt bracket, such as by way of the at least one breakaway insert and translate (e.g., at least partially longitudinally) during the secondary impact for moving the lever away from the user. During detachment (e.g., during breakaway of the breakaway insert), the inner structure of the column housing allows the inner column tube to move forward relative to the column housing. An inner wall structure of the column housing, the tilt bracket, or both, may open relative to the inner column tube to allow forward motion relative to the column housing. For example, inner wall surfaces of the column housing are such that they spread apart from each other (e.g., due to residual internal stress), thereby allowing the inner column tube to move forward relative to the column housing.

The teachings herein also contemplate methods. For example, the teachings envision a method of managing energy distribution and controlling adjustment lever disposition resulting from a secondary impact of a vehicle occupant by using an automotive vehicle steering column assembly as described in the above, and as set forth more specifically in the following teachings.

As can be gathered from the description herein, the teachings envision in one or any combination of the following general aspects, a steering column assembly by which (i) a securing member (e.g., a tilt bolt) may disengage from at least a portion of a bracket (e.g., a tilt bracket) in the event of an impact such as a secondary impact; (ii) a column housing may unclamp or otherwise become disengaged from an inner column tube in the event of a secondary impact; (iii) an energy absorption device may be engaged and actuated in the event of an impact such as a secondary impact and helps to absorb energy from the impact; (iv) a securing member may apply a force to an energy absorption device during an impact such as a secondary impact as the securing member travels forward (e.g., upon disengagement from at least a portion of a bracket (e.g., a tilt bracket); (v) a lever associated with a manually actuated steering column assembly (e.g., for actuating rake and/or reach functions) may translate forward in the event of an impact such as a secondary impact; (vi) a lever associated with a manually actuated steering column assembly (e.g., for actuating rake and/or reach functions) may translate forward in the event of an impact such as a secondary impact and may carry only a portion or no portion of a bracket (e.g., a tilt bracket) with it; (vii) the structure is adaptable for an internally collapsing steering column assembly or an externally collapsing steering column assembly; (viii) in lieu of a lever actuating, there can be substituted another position locking actuator (e.g., an electromechanical switch); or (ix) at least a portion of the bracket (e.g., the tilt bracket) remains in its original fixed position in a vehicle following secondary impact; (x) for an internally collapsing system, the original pivot location remains the same as the resulting pivot location following an impact such as a secondary impact; or (xi) in the event of an impact such as a secondary impact, and upon disengagement of a securing member relative to at least a portion of a bracket, a forward travel of the securing member causes unclamping or other disengagement of a column housing relative to an inner column tube.

As can be seen, it is thus possible to realize a unique assembly (and associated methods) that enable a steering column assembly to transmit steering torque, smoothly rotate, and absorb energy during an impact such as a secondary impact during a vehicle collision, while also providing adjustable driving positions.

BRIEF DESCRIPTION OF THE DRAWINGS

FIG. 7a is a side view of an assembly in a normal operational mode.

FIG. 7b is an illustrative side view of the assembly of FIG. 7a after a collapse stroke has occurred.

FIG. 8a is an illustrative bottom view of an assembly in a normal operational mode.

FIG. 8b is an illustrative bottom view of the assembly of FIG. 8a after a collapse stroke has occurred.

DETAILED DESCRIPTION

Figure 1:
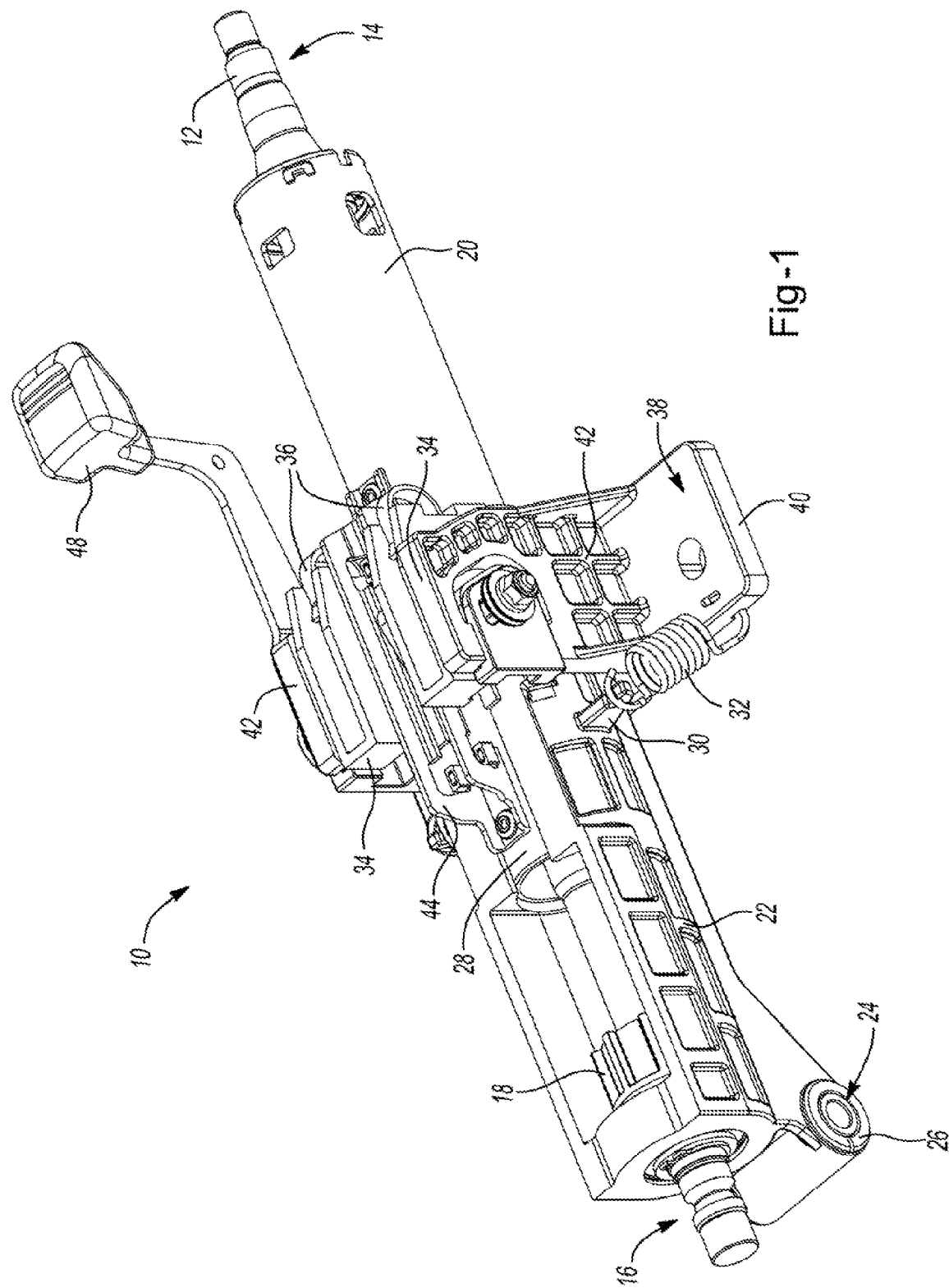
FIG. 1 is a perspective view of an illustrative assembly in accordance with the present teachings viewed from the bottom.

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the an to variously employ the present teachings.

In general, and as will be appreciated from the description that follows, the present teachings pertain to a collapsing steering column assembly. The steering column assembly may include a mounting portion for securing the steering column assembly in a vehicle in a fixed operational position. The assembly may have a collapsing portion, at least a portion of which is adapted to travel forward relative to the mounting portion, while the mounting portion stays generally in its fixed operational position (e.g., any travel of the mounting portion is controlled and limited to an amount of less than about 50 mm, 20 mm or even 10 mm). Among its basic concepts the teachings are directed to a steering column assembly that, in the event of an impact such as a secondary impact that results in a load of a certain threshold amount (e.g., a load of about 0.5 kN or more or about 2 kN or more; a load of about 10 kN or less or about 5 kN or less), may be adapted so that at least a portion of the collapsing portion travels forward within the vehicle. The forward travel may be in a telescopic manner (e.g., at least one first structure that is operatively connected to a steering wheel (such as an inner column tube) may advance forward (e.g., along an axis that is generally parallel with (such as within about 10° of being parallel with) a vehicle longitudinal axis) in a vehicle relative to at least one second structure that may at least partially surround the at least one first structure (e.g., a column housing)). As will be also seen, the teachings envision that the steering column assembly may include a tilt or rake adjustment that is adapted to allow a user to select an angle of inclination of a steering wheel, a reach adjustment that is adapted to allow a user to select an appropriate fore-aft position of the steering wheel, or both. In general, any such adjustment may be controlled by a suitable user operating device (e.g., a lever, an electromechanical actuator, or otherwise). For a manually operated system, a lever or other user operating device may be adapted to control a force applied to maintain the collapsing portion in a user selected position. For example, a lever or other user operating device may be in operative engagement with one, two, or more clamping portions or other suitable mechanism to releasably (and possibly adjustably as well) secure two or more components of the collapsing portion together. Clamping or other securing may be realized by a suitable securing member (e.g., an elongated force applying member), such as a bolt (e.g., a tilt bolt), rod, strap, bar, band, wedge, or other suitable member. For instance, the securing member may be adapted, upon actuation of the user operating device to cause generally opposing portions (e.g., clamping portions) to separate or come closer together such as, respectively, for releasing the components relative to each other or for securing the components relative to each other.

The securing member is held in a fixed position within the steering column assembly during normal vehicle operation. In the event of an impact such as a secondary impact, it is envisioned that some or all of the securing member may disengage from the fixed position and travel forward in the vehicle. For example, the securing member may be configured for allowing it to rupture, plastically deform, or cause some other structure (e.g., a portion of the collapsing portion and/or mounting portion, such as a mounting arm) to rupture or plastically deform upon realization of a predetermined load. In this manner, it may be possible that the securing member releases any force being applied to secure components of the collapsing portion together, so that collapse is possible. It may be possible as well that the securing member may be connected with a user operating device (e.g., a lever). Forward movement of the securing member thus may also cause the user operating device to travel forward as well.

As noted, the bracket structures (e.g., tilt brackets) of the teachings herein can be modified to provide a breakaway structure. A bracket may include an upper wall and projecting side walls (e.g., including an elongated slot for tilt adjustment) as previously described. Instead of a breakaway insert, the side walls may be configured to define one or more stress concentrators. Thus in the event of an impact such as a secondary impact, an elongated fastener or other securing member (e.g., tilt bolt) may cause a portion of one or both of the side walls to rupture so that breakaway can occur. For example, a notch defining a thinned portion may be employed. The side wall structure (e.g., a forward or a rearward portion of the sidewall structure) may thus be structured to allow a portion of the side wall (e.g., a lower portion, an upper portion, a forward portion and/or a rearward portion) to break away from another fixed portion (e.g., respectively, an upper portion, a lower portion, a rearward portion and/or a forward portion). The elongated fastener or other securing member may thus be retained in the broken away portion. The elongated fastener or other securing member may break through a portion of the side wall. By way of example, a thinned forward wall section in one or both side walls may be defined as a result of a notch from a rear portion of the side wall. A thinned forward section of one or both sidewalls may be employed. One or more optional notches may be employed in a forward facing portion of one or both side walls. One or more of such a notch or some other suitable structure may assist in defining one or more stress concentrators for helping to control rupture of the forward portion of the side wall for allowing the elongated fastener or other securing member to break away from the bracket (either carrying a portion of one or both side walls or not). Any combination of the above features may be employed.

The teachings, in general, also envision the possible use of one or more energy absorption devices. The energy absorption devices may be a suitable device adapted to deform elastically and/or elastically and plastically. In the course of deforming, the energy absorption devices are thus adapted to absorb energy by way of the deformation. The energy absorption device may be operatively connected or located between or among two or more components. It may be configured so that it limits relative movement as between or among two or more components. The energy absorption devices may be wires, plates or the like. They may have a constant profile or a varying profile along their length. They may be employed to have one or more fixedly constrained portions (e.g., an end). They may have one or more free ends.

As the above indicates, there are many unique features associated with the present teachings. It is possible, in the event of an impact such as a secondary impact, for at least a portion (if not all) of the securing member to break away from its normal operating position (e.g., a secure engagement position). It is possible, in the event of a secondary impact, for at least a portion (if not all) of the securing member to travel at least a portion, if not the full extent, of a stroke occasioned by the impact. It is possible, in the event of an impact such as a secondary impact, for at least a portion (if not all) of the securing member to break away from its normal operating position and cause a release of a force (e.g., it releases one, two or more clamping portions) as between or among two or more components, so that the two or more components can move (e.g., in a defined manner) relative to each other (e.g., an inner column tube can move forward within such as telescopically) or otherwise relative to a column housing). It is possible, in the event of an impact such as a secondary impact, for at least a portion (if not all) of the securing member to break away from its normal operating position. It is possible to employ the teachings herein with an internally collapsing steering column assembly, though the teachings are not limited to such category of steering column assembly. For instance, the teachings herein may employ an arrangement by which the collapsing portion includes a column housing that is fixed for no forward movement upon an impact such as a secondary impact in a location within the vehicle (e.g., it may be pivotally fixed within a vehicle). The teachings herein may employ an arrangement by which the collapsing portion includes a column housing that is fixed for relatively slight forward movement within the vehicle (e.g., it may be pivotally fixed within a vehicle and adapted to travel forward by an amount less than about 50 mm, 20 mm or 10 mm in the event of an impact such as a secondary impact).

As noted, one of the features herein relates to the ability, in the event of an impact such as a secondary impact, for at least a portion (if not all) of the securing member to break away from its normal operating position. In illustrative embodiments described in the following, it will be seen that one approach is to employ a lever or other user operating device that applies a securing force (e.g., by way of an elongated fastener such as tilt bolt or other securing member) to actuate hardware of a subassembly for causing clamping or unclamping (or some other engagement/disengagement) of the column housing to the inner column tube. Though the breakaway function is described as being achieved by use of a breakaway insert that cooperates with a tilt bracket, other structural arrangements are possible as well. By way of example, without limitation, other structures that may be employed as an alternative to, or in addition with, the breakaway insert of the present teachings include the use of locally weakened portions of side walls of a bracket such as a tilt bracket (e.g., a locally weakened portion, such as by use of a relatively thin wall, a wall with one or more predetermined stress concentrators, material choice, any combination thereof or otherwise). This may be in the form of a forward facing edge portion of a bracket that adjoins an elongated slot, such as a tilt guide slot. It may be in a form of a relatively thin neck that connects one or more side walls of the bracket to an upper portion. Upon realization of a predetermined threshold load from an impact such as a secondary impact, the locally weakened portions may rupture, shear and/or deform in response to a load, so that it releases forces applied to secure two or more components together, and thereby allow at least one of the components to travel relative to another.

A locally weakened securing member (e.g., an elongated fastener such as a tilt bolt) may be selectively weakened (e.g., by material choice, by stress concentration design (e.g., inclusion of a selectively thinned section in a region where stress concentration is desired), or both). In this manner it may rupture, shear and/or deform in response to a load, so that it releases forces applied to secure two or more components together, and thereby allows at least one of the components to travel relative to another. Any combination of the above can be employed as well.

In examples illustrated, teachings describe aspects useful for an internally collapsing steering column assembly for an automotive vehicle. In general, an assembly of the teachings herein may include a steering shaft (e.g., one that can be coupled with a steering wheel or other steering device) and/or an inner column tube that supports the steering shaft (e.g., via one or more bearings). A column housing may be employed. It may be adapted to telescopically couple with the inner column tube (e.g., each may have a longitudinal axis that is generally parallel or even coaxial with each other). A bracket may be employed for at least partially securing either or both of the inner column tube or the column housing to the vehicle (e.g., to a cross-vehicle structure). The bracket may include a suitable portion (e.g., a slot such as a generally vertically oriented slot) adapted to provide a guide structure for a tilt function. A user operating device, such as a lever, may be employed for allowing a user to manually operate the assembly. An electromechanical device that applies or releases a force in response to a signal from an operation switch may be employed. The lever or other user operating device may be such that, depending upon its position, it causes clamping of the inner column housing relative to the inner column tube. The lever or other user operating device may be such that, depending upon its position, it causes an engagement or disengagement (e.g., clamping or unclamping) of the column housing relative to the inner column tube. The lever or other user operating device may be associated with a steering wheel adjustment subassembly and configured so that in the event of a threshold load realized during an impact such as a secondary impact, at least a portion the subassembly is able to break away from its typical operational position. As a result of the breakaway, the lever or possibly at least a portion of the user operating device may thus be able to travel forward, e.g., away from the user. As a result of the breakaway the inner column tube may thus be rendered able to translate forward relative to the column housing, carrying with it the steering wheel attached. As a result, it can be seen that it is possible that one or both of the lever (or possibly an electromechanical actuator or some other portion of the user operating device), or the steering wheel is rendered able to translate forward, e.g., away from the user.

With reference now to more particular examples of suitable structures of the present teachings, it can be seen that the teachings address an assembly that may typically include an inner column tube, a steering shaft, a bracket (e.g., a tilt bracket), a column housing, and a steering wheel adjustment subassembly (e.g., a manually operated steering wheel adjustment subassembly). The steering wheel adjustment subassembly may include a lever (as discussed, or some other user operating device) adapted for actuating (e.g., manually actuating) the subassembly, and at least one engagement member that is brought into and out of engagement with the inner column tube for selectively locking the steering shaft into a position desired by a user. A mounting structure may detachably mount the steering wheel adjustment subassembly relative to the bracket (e.g., tilt bracket). At least one structure configured to allow for breakaway of at least a portion of the steering wheel adjustment subassembly relative to a fixed component of the assembly may be employed. For example, at least one breakaway insert may detachably mount the steering wheel adjustment subassembly to the bracket (e.g., tilt bracket). A fastener assembly operatively connects the lever, the engagement member and the breakaway insert. During an impact such as a secondary impact, the column housing remains in a generally fixed position relative to a forward pivot mounting location (e.g., any forward translation is limited to a relatively small amount (e.g., about 20 mm or 10 mm)). Further, at least a portion of the steering wheel adjustment subassembly (e.g., suitable mounting structure) is adapted to detach from or otherwise become translated relative to the bracket (e.g., tilt bracket) by way of the at least one breakaway structure (e.g., breakaway insert) and translate (e.g., at least partially longitudinally) during the impact such as a secondary impact for moving the lever away from the user. In this manner, it is also envisioned that the inner column tube may become un-clamped or otherwise disengaged and translated forward relative to the column housing, the bracket (e.g., tilt bracket), or both.

With more attention now to the details of the assemblies herein, they generally will include a tube that is operatively connected with a steering wheel (not shown), e.g., via a steering shaft. One such tube, referred to herein as an inner column tube, typically will have a hollow cavity along at least a portion of (if not the entirety of) the length of the tube and may be sized and configured to receive and support a rotatable shaft, namely a steering shaft and possibly one or more bearings. Both the shaft and the tube will have a longitudinal axis. When installed in a vehicle, the longitudinal axis of each the shaft and the tube (as well as the steering column assembly in general) may be generally coaxially aligned, aligned generally parallel with a longitudinal axis of a vehicle, or each. The shaft and the inner column tube typically will be made of or otherwise include a suitable metal, such as one or more of iron (e.g., steel), magnesium, zinc, or aluminum.

The inner column tube may be generally cylindrical and hollow. It may have a forward end portion and a rearward end portion, and a longitudinal axis. Either or both of the forward or rearward end portion may include a suitable bearing that supports the steering shaft for rotation.

The steering shaft may have a rearward end portion adapted to receive a steering wheel (not shown). It may have a forward end portion that penetrates through and may be supported by a bearing, a key lock collar or both. As noted, the steering shaft may be supported for rotation at least in part by the inner column tube and have a longitudinal axis that may be generally coaxially aligned with the longitudinal axis of the inner column tube.

One or more suitable brackets may be employed. Any such bracket may include a portion for mounting the steering column assembly within a vehicle (e.g., it can be secured to a vehicle structure, such as a cross vehicle beam, instrument panel, or otherwise). The bracket may have a portion that at least partially adjoins the steering shaft support structure (e.g., the inner column tube, the column housing or both).

For example, it may include one or a plurality of downward depending (downwardly oriented) walls that define a tilt portion of the bracket. One or more of the downward depending walls may be adapted to provide a structure that has an elongated slot that provides guidance for the tilt function (e.g., it provides a guide path for a securing member such as a tilt bolt as it travels during adjustment; it may thus limit upward and downward travel). The bracket may be an integrated structure so that the tilt portion and the mounting portion are a single structure (e.g., a casting, a stamping, or a combination thereof). The bracket may be made of separate structures that are assembled together to define the mounting and tilt portions in a single structure. The mounting portion may be omitted. The tilt portion may be omitted. A mounting bracket may be employed separately from a structure defining a tilt portion. Examples of brackets that may be employed, in addition to the examples described herein, include those of United States Published Application No. 20100300238 (the entirety of which is incorporated by reference for all purposes; see, e.g., description of bracket 20); U.S. Pat. No. 6,467,807, the entirety of which is incorporated by reference for all purposes (see e.g., description of brackets 6 and 7 and associated structure).

One or more brackets (e.g., tilt brackets) may be employed and adapted for receiving at least a portion of a steering shaft support structure (e.g., at least a portion of the inner column tube, the column housing, or both), and/or for mounting the steering column assembly within the automotive vehicle. By way of example, a tilt bracket of the present teachings may include an upper portion that is adapted to be secured to a vehicle structure, such as a cross vehicle beam, instrument panel, or otherwise. The bracket (e.g., tilt bracket) may have a pair of generally opposing downwardly oriented or projecting walls. The bracket (e.g., tilt bracket) may have a structure that at least partially flanks at least a portion of the steering shaft support structure (e.g., the inner column tube). The bracket (e.g., tilt bracket) may include a pair of opposing side walls, and an upper wall that is configured to attach to the vehicle (e.g., to a cross vehicle beam, an instrument panel, or other suitable structure). The side walls may project outward relative to the upper wall (e.g., they may be generally orthogonally or obliquely disposed relative to the upper wall). The bracket (e.g., tilt bracket) may have a single downwardly projecting or oriented wall. The bracket (e.g., tilt bracket) may be disposed laterally above, and outward relative to an opposing portion of the column housing.

For teachings that employ an illustrative breakaway insert as described herein, one or more of the side walls may have one or more cut-outs, e.g., generally c-shaped cut-outs. The cut-outs may open from a generally forward direction of the side walls (e.g. forward facing cut-out). One or more surfaces that define the cut-outs may be tapered in a longitudinal direction. The tilt bracket may be a cast structure (e.g., a casting containing aluminum, magnesium, or steel). The side walls may also include one or more elongated guide slots to provide a structure that allows components of the steering column assembly to be guided while being raised or lowered. For example, the side walls may have a forward facing edge that is downwardly oriented. A forward wall that defines the elongated guide slot may be spaced from the forward facing edge by a distance that enables the side wall to rupture upon a predetermined load from a secondary impact. The side walls may have a relatively thin neck that connects one or more side walls of the bracket to an upper portion. The neck thickness may be sufficiently sized to enable tilt adjustment and securing in a fixed position while resisting forward forces normally encountered from an operator while operating a vehicle and making column adjustments. It may be sufficiently thin that in the event of a load encountered during an impact such as a secondary impact from a collision, the neck will rupture to allow breaking away in accordance with the teachings herein.

It is possible that the teachings herein can be employed for steering column assemblies that are not adjustable, but which still require the ability to collapse. In such instances, there will be no rake or reach adjustment hardware. However, the concepts herein may still be adapted to achieve collapse. A mounting bracket may secure one or both of a column housing, or an inner column tube, to a vehicle. For example, a mounting bracket can incorporate a breakaway insert or other breakaway feature as taught herein on one or more of its side walls for allowing forward travel upon a threshold load from an impact such as a secondary impact. Hardware for securing the steering column assembly to the mounting bracket may be adapted to rupture or otherwise break away from the mounting bracket. An energy absorption device may be employed to limit forward travel. Other variations will be apparent from the teachings herein, and breakaway features of the various embodiments herein may be used for this embodiment.

The present teachings, however, have particular applicability for steering column assemblies that are adjustable (e.g., for rake and/or reach). The assembly may include a manually operated steering wheel adjustment subassembly adapted for selectively adjusting the steering shaft in a fore or aft direction generally along the longitudinal axis, selectively raising or lowering the steering shaft, or both. The steering wheel adjustment subassembly may include a lever or other adapted for manually actuating the subassembly. The subassembly may include at least one engagement member that is brought into and out of engagement with the inner column tube for selectively locking the steering shaft into a position desired by a user (e.g., a fore or aft position). The subassembly may include at least one breakaway insert that detachably mounts the steering wheel adjustment subassembly to the tilt bracket. The subassembly may include a fastener assembly (e.g., one that includes at least one fastener, which may be referred to as a tilt bolt) that operatively connects the lever, the engagement member, and the breakaway insert. Other suitable hardware may be employed in the subassembly, such as one or more thrust bearings, one or more nuts, one or more cam fix elements, and/or one or more cam move elements (e.g., where the cam fix and the cam move elements are in opposing operative relationship with each other, such as by contacting each other). The subassembly may also include one or more spacers as described further herein.

A column housing is pivotally mounted at a pivot mounting location (e.g., a permanently fixed mounting) within the automotive vehicle. The pivot mounting location may be at or within about 20, 30, 40 or 50 mm of a forward end of the column housing. The pivot mounting location may be on an underside of the column housing, on a top side of the column housing, or at some location in between the topside and the underside of the column housing. The column housing at least partially surrounds the inner column tube, and may be in clamping relation with the inner column tube when the lever or other user operating device is in a desired position so as to permit steering shaft adjustment (rake and/or reach) by way of the steering wheel adjustment subassembly. The column housing may include a suitable clamping structure (e.g., two or more clamping portions (such as those shown as elements 12a and 12b in U.S. Pat. No. 6,467,807, incorporated by reference for all purposes)). For instance, it may include an elongated longitudinally oriented opening that defines opposing inner wall surfaces that are urged toward the inner column tube for clamping the column tube into position (e.g., by use of the lever to actuate hardware of the subassembly, such as the cam fix, cam move elements, and/or thrust bearing). The column housing may have one or more projections or other structure to receive a biasing device (e.g., a spring) that connects the column housing with the tilt bracket. The column housing may be a cast structure (e.g., including a metal such as aluminum, magnesium, zinc, and/or iron (e.g., steel)).

Examples of suitable column housing structures and arrangements can be found in U.S. Pat. No. 6,467,807 (referred to as "outer column"), the entirety of which is incorporated by reference for all purposes. The column housing may include clamping portions (such as those shown as elements 12a and 12b in U.S. Pat. No. 6,467,807). The clamping portions may face upwardly (e.g., as in embodiments of FIGS. 3, 5A-C, 6A-C, 7, and 11 of U.S. Pat. No. 6,467,807). The clamping portions may face downwardly (e.g., as in embodiment of FIG. 14 of U.S. Pat. No. 6,467,807). See also, United States Published Application No. 20100300238, the entirety of which is incorporated by reference for all purposes.

Clamping may be realized by way of a force from the steering wheel adjustment subassembly exerted by the lever or other user operating device to cause the column housing to compress around the inner column tube. The force may be applied by way of the side walls of the bracket (e.g., of the tilt bracket), whether by way of by way of any breakaway insert as described herein or not. It is also possible that a column housing is omitted, and/or in lieu of applying force to cause clamping portions of the column housing to compress and engage the inner column tube, force is applied directly by way of the bracket side wall (and possibly indirectly by way of any breakaway insert as described herein).

As will become further apparent with reference to the drawings, during a secondary impact, the column housing may remain in a generally fixed position relative to the pivot mounting location. It may be secured in such a way that it translates forward a relatively small amount (e.g., less than about 50 mm, 20 mm, or 10 mm).

During an impact (such as a secondary impact), the structures of the present teaching may be configured to include a suitable combination of elements arranged in a manner so that an elongated fastener such as a tilt bolt or other securing member, which may be operatively coupled with a lever or other user operating device is able to translate longitudinally and disengage from structure to which it is secured when in a clamped position. For example, the elongated fastener (such as a tilt bolt) or other securing member effectively may break away from side walls of a bracket (e.g., side walls of a tilt bracket). In one example illustrated herein, a suitable mounting structure (namely, one that includes at least one breakaway insert) is adapted to detach from the tilt bracket, such as by way of the at least one breakaway insert and translate longitudinally during the secondary impact for moving the lever away from the user. As seen, a clamping force that clamps the column housing relative to the inner column tube (e.g., via the side walls of the column housing) may be released, thereby allowing the inner column tube to translate relative to the column housing.

The assembly herein may further employ an energy absorption structure of the type described in Published U.S.

Application 2013/0233117, the entirety of which is incorporated by reference herein for all purposes. For instance the assembly herein may include at least one plastically deformable energy absorption device (e.g., a bend plate, a wire, or some other structure adapted to be carried at least partially by the column housing), wherein the energy absorption device, when employed, absorbs energy by plastic deformation during the secondary impact after the subassembly starts to translate along the column housing. Any plastically deformable energy absorption device may thus limit the extent of longitudinal travel of the securing member. In an illustration of the present teachings, a breakaway insert may be employed as a structure that allows the securing member to become disengaged from a bracket (e.g., a tilt bracket). The breakaway insert may be configured to complement the structure of the bracket (e.g., tilt bracket). It may have a length (such as from its forward-most point to its rearward-most point). It may include a tapered portion that tapers from a forward portion toward a rearward portion of the insert. It may include an elongated slot (e.g., in a rearward portion of the insert) adapted to receive a fastener of the fastener assembly (or some other securing member), such as a tilt bolt, and allow upward and downward motion of the steering shaft relative to the bracket (e.g., tilt bracket). Desirably, during normal operation, the tapered portion of the breakaway insert contacts an opposing surface of the bracket (e.g., tilt bracket) and the dimensions of either or both of the taper of the tapered portion or the opposing surface are such that as the impact such as a secondary impact occurs, the breakaway insert is able to detach from at least a portion of the steering shaft support structure (e.g., column housing), at least a portion of the securing member that breaks away, or both to translate forward. It will be appreciated that the taper can be omitted from the breakaway device and instead located only on the tilt bracket, or vice versa.

The engagement member may be a spring biased cam device. The engagement member may optionally include teeth, which may be adapted to engage the inner column tube. A user operating device, such as a lever, may operate a cam locking system to apply clamp pressure. For instance, the engagement may be such that it occurs (e.g., via cam teeth) during an impact such as a secondary impact as the inner column tube starts to move forward. Such engagement may in turn help initiate when breakaway starts to occur. The engagement member may also be such that when a tilt lever is released, the engagement member rotates and does not touch the inner column tube so the steering wheel can be adjusted, and when the tilt lever is in a lock position the engagement member (e.g., via cam teeth) may be in contact with the inner column tube.

The assembly may also include a longitudinally slotted plate stop device attached to the inner column tube. The longitudinally slotted plate stop device may be disposed in an elongated opening of the column housing and may be configured to be fastened or otherwise attached to the inner column tube. The longitudinally slotted plate stop device may include one or more base portions at each of its forward and rearward end portions. It may include opposing side walls that project upward from the one or more base portions. It may include longitudinally extending side slots adapted to receive the fastener or other securing member. It may include at least one transversely extending flange on one or more of the side walls. It may include one or more elastic stoppers at terminal locations of the longitudinally extending side slots. It may include an upper longitudinal slot adapted to receive the engagement member. As can be appreciated from the teachings herein, with reference to the illustrative embodiments, the plate stop device may be adapted to guide and/or restrict the travel of the fastener or other securing member as the fastener or other securing member travels forward during a secondary impact.

As can be seen, the fastener or other securing member may be elongated. It may be at least partially surrounded by at least one spacer. The fastener or other securing member may be at least partially surrounded by a hollow generally cylindrical spacer that has a first portion adapted to oppose any energy absorption device, such as an energy absorption plate, and allow for sliding engagement with any such plate during the secondary impact. The spacer may have a second portion that includes one or more projections adapted to be received within the tilt bracket, the column housing, or both, and that may be able to shear during the secondary impact to allow the fastener or other securing member to translate forward. For instance, the projection may be on opposing sides of the spacer. The projections may be located offset relative to a longitudinal axis of the spacer. The projections may have a height (relative to an enlarged head of the spacer) of about 1 to about 5 mm. The projections may have a width of about 1 to about 5 mm. The projections may be taller than they are wide, or vice versa. They may have a width that is about the same as its height. The spacer may be dimensioned or configured so that at least a portion of it is disposed beneath a portion of the slotted stop plate device for resisting column lash.

As can be appreciated from the above in the event of an impact occasioning a collapse stroke, the breakaway insert or other breakaway structure may result in a detachment of the securing member (e.g. a fastener such as a tilt bolt) relative to the tilt bracket, the column housing and/or other side walls of a bracket or other structure. During the collapse stroke, the fastener (such as a tilt bolt) or other securing member (e.g., a structure that carries the lever or other user operating device) will be caused to translate forward, away from the user. The fastener (such as a tilt bolt) or other securing member may follow a guided travel path, such as a path defined by the plate stop device. In addition, to the extent that an energy absorption device is used (e.g., bend plates), they will help absorb energy, typically by plastic deformation (e.g., as they unwrap around the spacer, such as while being carried on the column housing). For example, one or more bend plates may be at least partially wrapped around a portion of the fastener (e.g., tilt bolt) or other securing member. The one or more bend plates may be secured at some point along its length (e.g., generally toward an end of the bend plate) to a fixed structure of the steering column assembly (e.g., the tilt bracket, the column housing or otherwise). As the fastener or other securing member travels forward, the fixation will constrain a portion while another portion (e.g., a forward oriented portion) will bear against the fastener or other securing member or a structure associated with it (e.g., the spacer). As a result of the force, the one or more bend plates may plastically deform. For example, it may deform without plastic elongation, without plastic compaction, without plastic buckling or any combination thereof. The forward end of the column housing may remain fixed in place, or otherwise be limited in the extent of forward travel (e.g., in an amount of less than about 50 mm, 20 mm or 10 mm). In addition, by the release of the structure applying a clamping or other securing force for the inner column tube (e.g., by release of the breakaway insert from the tilt bracket), clamping or other securing forces for (e.g., those caused by the column housing) the inner column tube will be released and will allow the inner column tube to translate forward as well.

In general, the teachings herein envision a steering column assembly that employs a column housing with an inner column tube. The teachings are not limited solely to such assemblies. The teachings also have general application to other types of steering column assemblies. Without limitation, for example, the teachings are also contemplated for use with a steering column assembly that is known typically as a translating column type assembly. Such an assembly may integrate a column housing with an inner column tube. Such integration may be in the form of a single fabricated unit (e.g., a casting). The unit may be mounted within a vehicle. It may be mounted by way of one or more pins in one or more slots. An energy absorption unit may be employed as well. During a secondary impact, the unit may travel forward along with a tilt lever, or in the absence of a tilt lever.

Put another way, by way of summary (without limitation) of the general teachings herein, in a general respect, the present teachings relate to a collapsing steering column assembly. The assembly includes a steering shaft support structure. For example, it may include a column housing, which may have one or more of the features as described in the present teachings. It may include an inner column tube which may have one or more of the features as described in the present teachings and being adapted for telescopic adjustment within the column housing. It may simply be a tube or other suitable hollow structure (e.g., the single fabricated unit integrated structure referenced above) for receiving a steering shaft. A steering shaft, which may have one or more of the features as described in the present teachings (which may support a steering wheel that is attached to it in part and may optionally be a part of the assembly), may be supported for rotation (e.g., by one or more bearings), at least in part by the steering shaft support structure and having a longitudinal axis. A bracket, which may have one or more features as described in the present teachings, may be employed for at least partially carrying the steering shaft support structure and attaching the assembly within a vehicle (e.g., to a cross-vehicle structure). For example, as described, the bracket may include a portion that provides a guide structure along one or more downwardly projecting walls for allowing tilt adjustment. At least one securing member, which may have one or more of the features as described in the present teachings (e.g., a tilt bolt, in the case of a tilt adjustable steering column assembly), may be employed for fixing the position of the steering shaft support structure relative to the bracket. For example, the at least one securing member may be operatively connected to an actuator or other user operating device (such as a lever or electromagnetic actuator). The at least one securing member may be operated to apply a force state (e.g., a clamping force) to help secure the steering shaft support structure in a fixed position. The assembly may include at least one breakaway structure associated with the bracket, the at least one securing member, or both. The at least one breakaway structure may have one or more of the features as described in the present teachings. The at least one securing member may be configured relative to the at least one breakaway structure in a manner such that in an event of an impact (e.g., a secondary impact) exceeding a threshold load, at least a portion of the at least one securing member breaks away from a secure engagement position by way of the at least one breakaway structure and allows the steering shaft support structure to translate forward (e.g., in a collapse stroke). The threshold load may be a load of about 0.5 kN or more, or about 2 kN or more. The threshold load may be a load of about 10 kN or less, or about 5 kN or less. The threshold load may be based on a customer's specified load requirements, which is typically between about 2 kN and about 5 kN. There may also be employed one or more energy absorption devices that are operable to absorb energy in response to a force applied to it at least partially due to the forward translation of the at least one securing member. For example, a bend plate, a wire, or the like, may be in operative engagement with the at least one securing member and with the steering shaft support structure so that energy is absorbed by way of plastic deformation of the energy absorption device. The energy absorption device may be operatively engaged by the at least one securing member in an event of an impact (such as a secondary impact) exceeding a threshold load. The securing member (e.g., a tilt bolt) may travel forward and may cause the energy absorption device to deform (e.g., plastically) so that energy from the impact is absorbed by virtue of the deformation.

Figure 2:
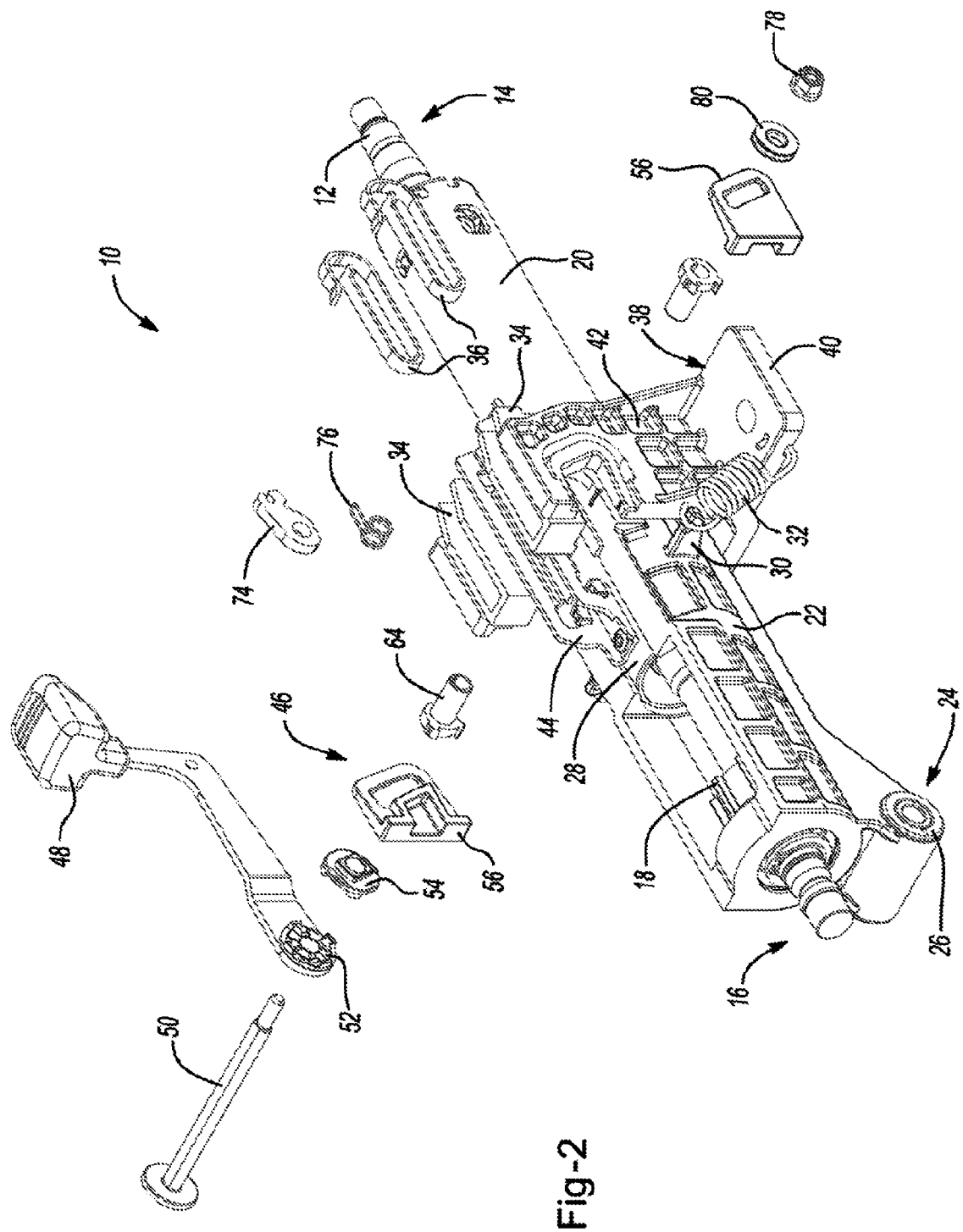
FIG. 2 is an exploded perspective view of the assembly of FIG. 1.
Figures 3, 4:
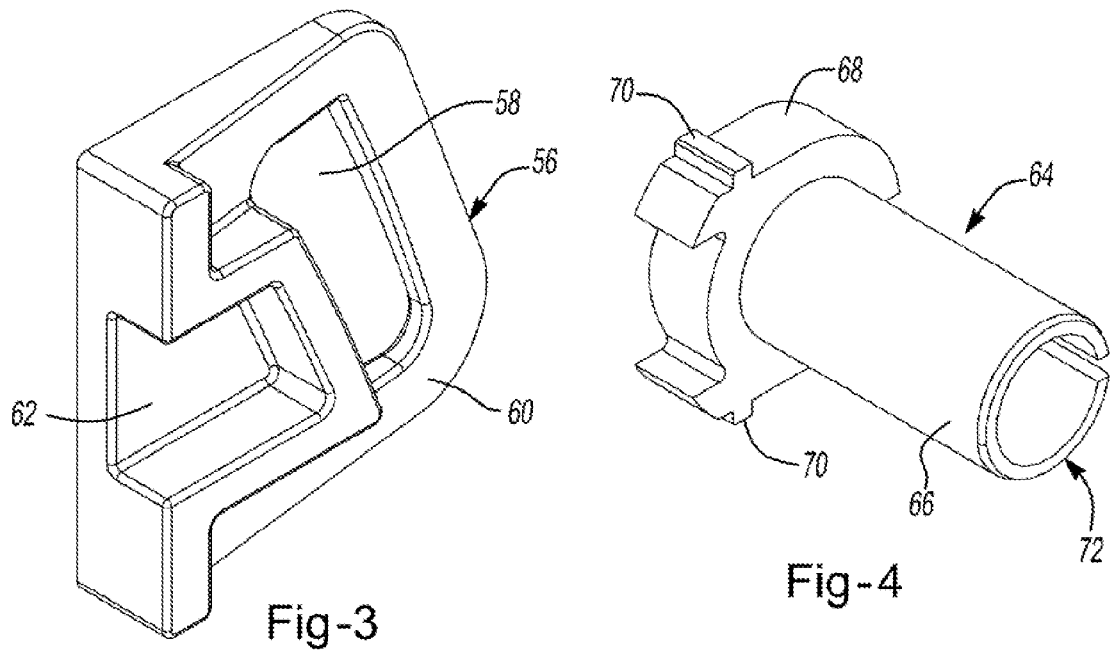
FIG. 3 is a perspective view of an illustrative breakaway insert in accordance with the present teachings.
FIG. 4 is a perspective view of an illustrative spacer in accordance with the present teachings.

Turning now to the drawings to provide one illustrative example of the teachings herein, reference is made first to FIGS. 1 and 2. FIG. 1 illustrates an assembly 10 that includes a steering shaft 12 having a rearward end portion 14 and a forward end portion 16. A key lock collar 18 is located toward the forward end portion. An inner column tube 20 is positioned toward the rear of the assembly, and is at least partially disposed in a forward facing column housing 22. The column housing has a fixed pivot location 24 that is closed except for a transverse cylindrical opening 26 to receive mounting hardware. The column housing may include a longitudinal opening 28. One function of the opening is to bisect the wall of the column housing that surrounds the inner column tube 20 so that bisected portions can be moved toward and away from each other to achieve clamping of the inner column tube 20. The column housing may have an arm 30 or other structure to receive and/or carry a biasing device 32 (e.g., a spring). The column housing may also include a suitable carrier 34 for any energy absorption device (e.g., plates 36).

A tilt bracket 38 has an upper wall 40 and projecting side walls 42. The biasing device 32 is connected to the tilt bracket 38 (e.g., via the upper wall 40).

The inner column tube may carry a plate stop device 44.

Actuation and adjustment of the assembly may be achieved by way of an adjustment subassembly 46. The adjustment subassembly may include a lever 48, and an elongated fastener (e.g., a tilt bolt) 50 may pass through the lever. A cam assembly may be employed. For example, a cam move 52 may be associated with the lever, and may oppose a cam fix 54. As seen in more detail in FIG. 3, breakaway insert 56 having an elongated slot 58, a tapered wall 60, and optionally a groove 62 is positioned between the lever and a spacer 64. In the embodiment shown, see FIG. 4, the spacer 64 has a hollow elongated shaft 66, and an enlarged head 68. The enlarged head (which may have one or more flat surfaces, e.g., upper and lower surfaces) has outwardly projecting shearable tabs 70 adapted to be inserted matingly into slots associated with the column housing to fix the position of the spacer, such as is seen in FIG. 6b. In the event of a secondary impact, the tabs can be sheared allowing the spacer to slide longitudinally. The shaft 66 has an end portion 72.

The subassembly further includes as an engagement member a cam lock 74 that optionally includes teeth on an engaging surface. The engagement member can be biased, such as by a coil spring 76.

In the illustrative embodiment shown, breakaway inserts are on opposing sides of the assembly, as are the spacers. The fastener connects, the elements together and is fastened in place with a nut 78 (e.g., a plastic nut, such as a nylon nut, with a flange on it) that adjoins a suitable bearing 80 (e.g., a thrust bearing).

Figure 5:
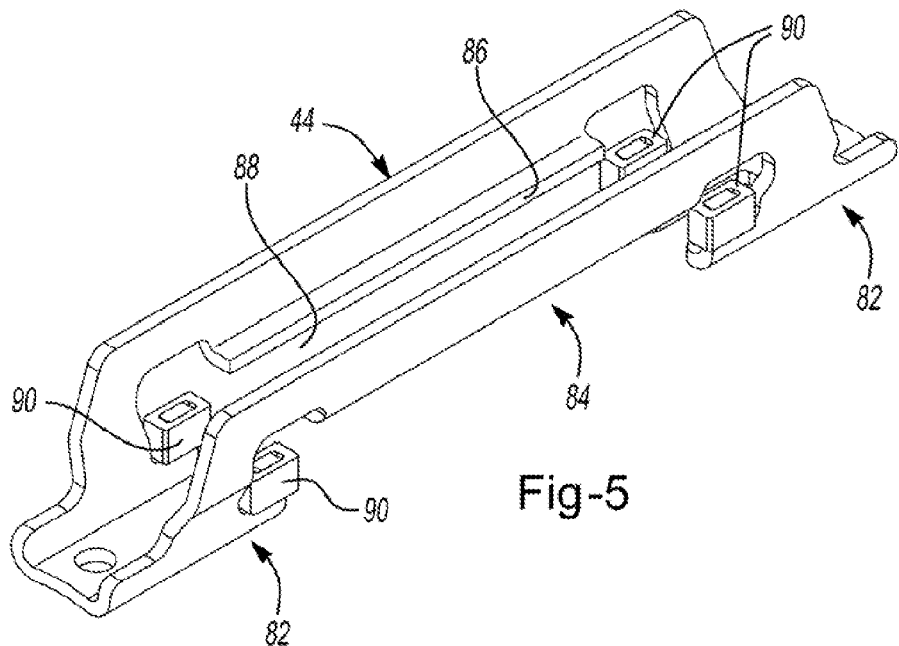
FIG. 5 is a perspective view of an illustrative plate stop in accordance with the present teachings.

The fastener includes a shank portion (which may have one or more longitudinal flat surfaces) that is positioned beneath a portion of the plate stop device 44, which is illustrated in greater detail in FIG. 5. The plate stop device 44 includes a base portion 82, a bridge portion 84 (beneath which the fastener (e.g., its shank) is located) with a lateral flange 86, an elongated slot portion 88 (in which the engagement member is located). Soft stoppers 90 (e.g., elastic stoppers) may be located toward the end of the bridge portions. The end portion 72 of the shaft 66 may reside at least partially beneath the bridge portion 84 of the plate stop (e.g., below a lateral flange 86) for resisting column lash, as seen in FIG. 6b.

Figure 6A:
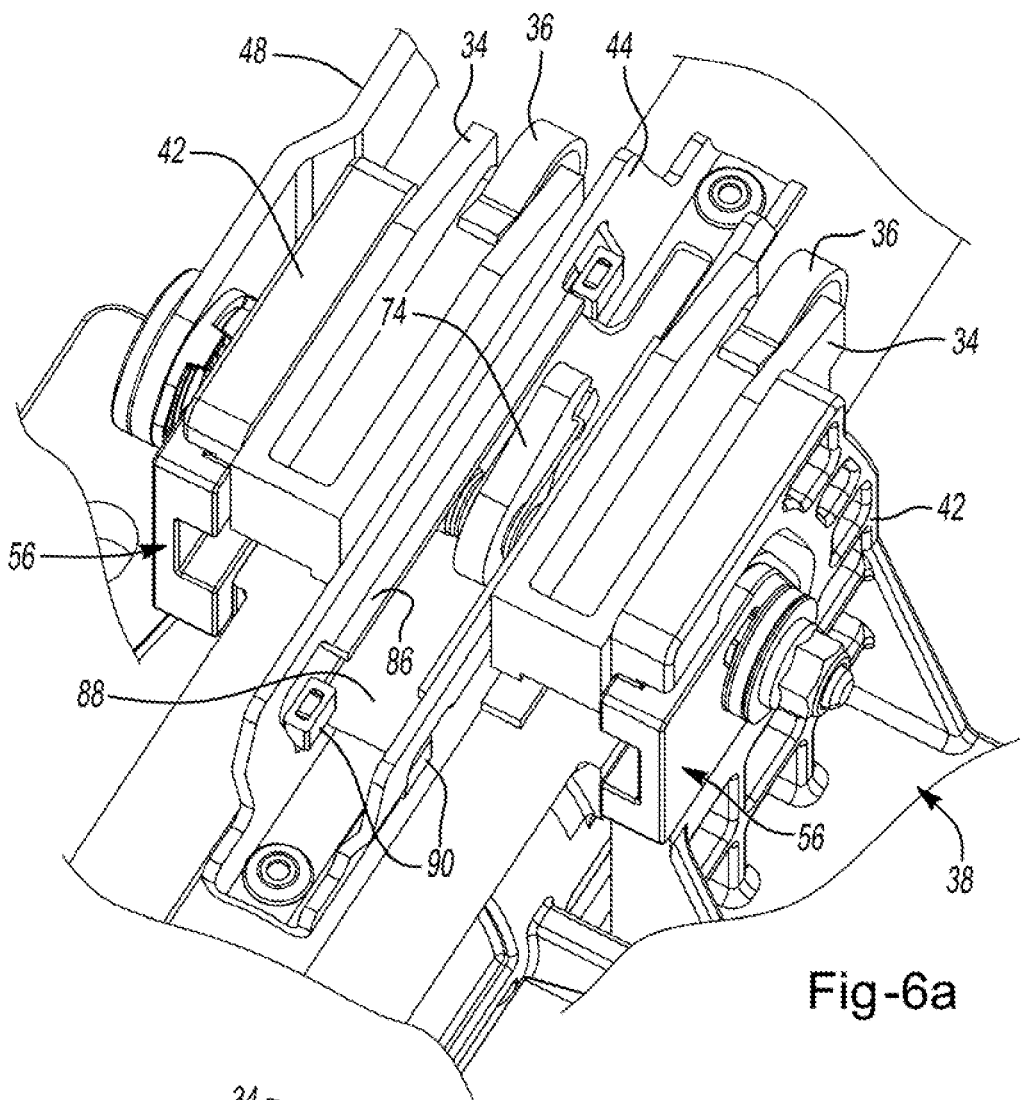
FIG. 6a is an enlarged perspective view illustrating use of an illustrative breakaway insert, such as that of FIG. 3.
Figure 6B:
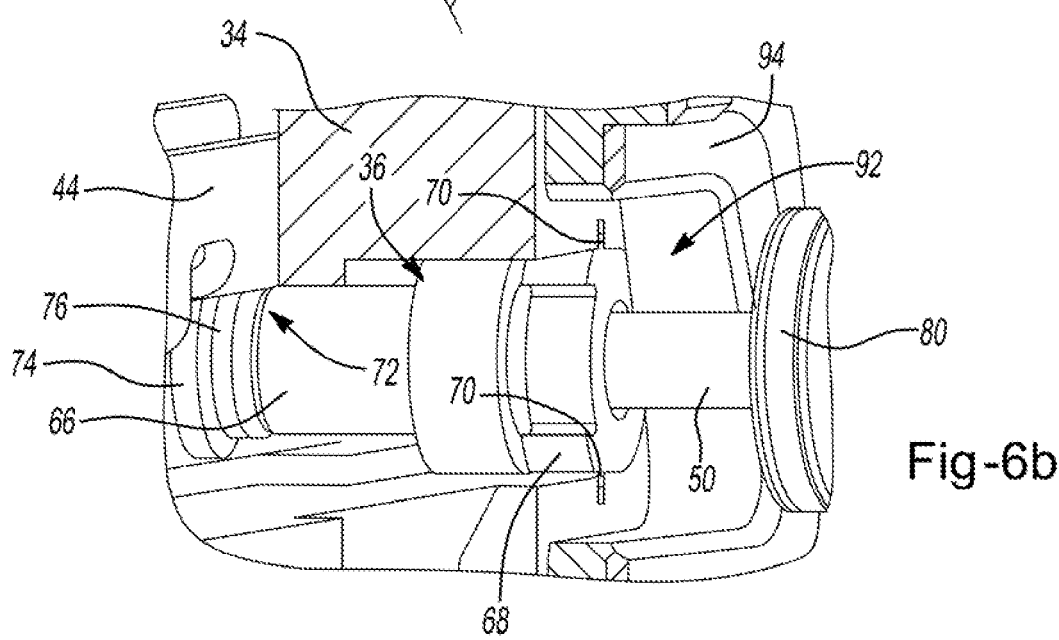
FIG. 6b is an enlarged perspective view illustrating use of an illustrative spacer, such as that of FIG. 4.

As seen in FIGS. 6a and 6b, one or both side walls 42 of the tilt bracket 38 has an opening 92 that receives the breakaway insert 56. Though other shapes can be employed the structure of the side wall 42 opening has a generally complementary shape as the outer portion of the breakaway insert. Thus it is possible that the breakaway insert 56 can nestingly reside within the side wall during normal operation. The side wall may include a tapered wall portion 94 that generally opposes the tapered wall 60 (see FIG. 3) of the breakaway insert.

With reference to FIGS. 7a, 7b, 8a and 8b, it can be seen how during a collapse stroke (depicted in FIGS. 7b and 8b) both the inner column tube 20 and the lever 48 translate forward, and away from the vehicle user. In such instance, when a threshold stress is realized, the tabs 70 (see FIG. 4) of the spacer shear and cause the fastener to urge the breakaway inserts 56 forward. As the breakaway inserts move forward, they will release and become disengaged from the tilt bracket, and will thus allow the column housing to release its clamping force upon the inner column tube. Due to the tapered portion 60 (see FIG. 3) of the breakaway insert, the tapered wall portion 94 (see FIG. 6b) of the top bracket side wall, or both, it is possible that the breakaway insert will allow releasing of the clamping force before the entirety of the length of the breakaway insert has translated in a forward direction. As seen, by virtue of the unique combination of elements, the subassembly thus translates forward and away from the user. Meanwhile, the column housing will remain in place (and will not become disengaged) at its fixed pivot location 24. Moreover, if bend plates 36 are employed, they may plastically deform for absorbing energy such as is taught in Published U.S. Application 2013/0233117, the entirety of which is incorporated by reference herein for all purposes. For instance they may be carried by the carrier 34 (see FIGS. 1, 2, 6a and 6b) of the column housing and deform around the spacer 64 (see FIG. 4).

Figure 9A:
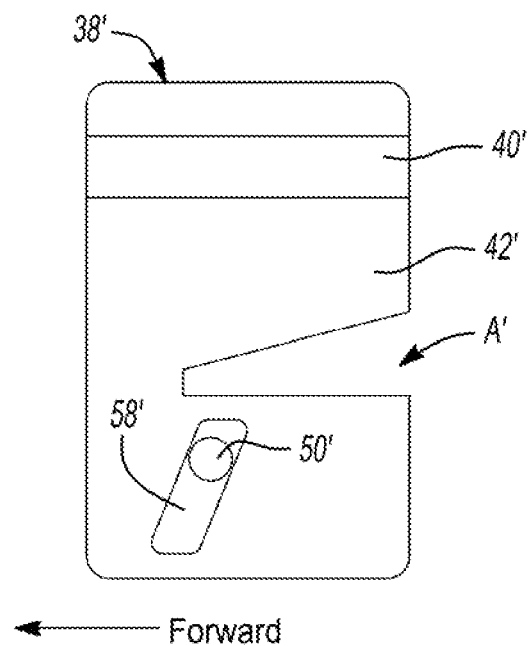
FIG. 9a is a side view of an illustrative bracket.
Figure 9B:
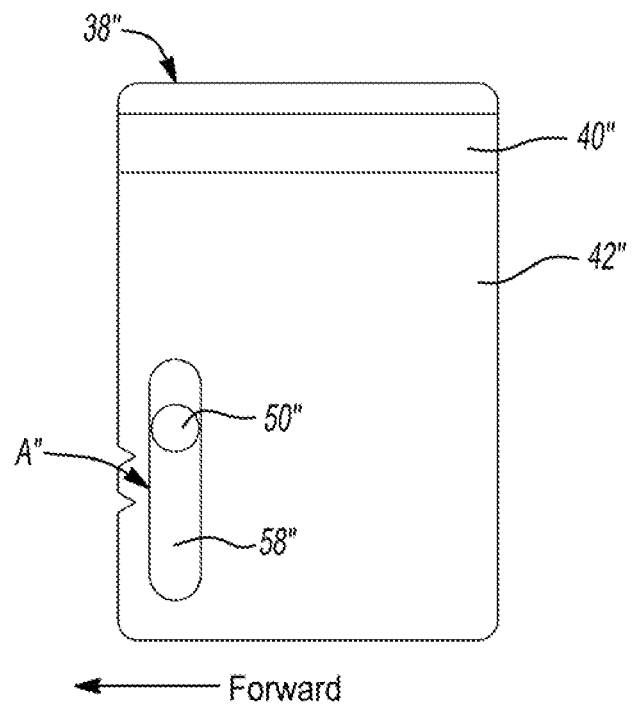
FIG. 9b is a side view of another illustrative bracket.

FIGS. 9a and 9b illustrate examples of how tilt brackets 38' and 38" of the teachings herein can be modified to provide a breakaway structure. The brackets 38' and 38" respectively each have an upper wall 40' and 40", and projecting side wails 42' and 42", akin to the embodiments previously described. However, in these embodiments, instead of a breakaway insert, the side walls are configured to define one or more stress concentrators. Thus in the event of a secondary impact, an elongated fastener or other securing member (e.g., tilt bolt) 50' and 50" located at least partially in an elongated slot 58' and 58" cause a portion of the side walls to rupture so that breakaway can occur. For example, in FIG. 9a, a notch A' defining a thinned portion (substantially juxtaposed with the notch A') is shown. The side wall structure (e.g., a rearward portion of the sidewall structure) may thus be structured to allow a portion of the side wall 42' (in the drawing shown, a lower portion) to break away from another fixed portion. The elongated fastener or other securing member may thus be retained in the broken away portion. In FIG. 9b, a thinned forward wall section A" is shown. Also shown in FIG. 9b is an optional notch in a forward facing portion of the side wall 42". One or more of such a notch or some other like structure may assist in defining one or more stress concentrators for helping to control rupture of the forward portion of the side wall for allowing the elongated fastener to break away from the side wall. A combination of some or all of the features of each of FIGS. 9a and 9b may be employed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As can be appreciated, variations in the above teachings may be employed. For example, it may be possible to make the steering wheel adjustment subassembly from multiple subassemblies. A fastener for applying clamping to the inner column tube via a cam may be separate from a fastener to which the breakaway inserts are secured. A structure for receiving the breakaway insert need not necessarily be a cut-out relative to side wall of the tilt bracket. A tilt positive locking plate may engage teeth on a forward portion of the tilt bracket when breakaway has occurred. The energy absorption mechanism described may be substituted with some other mechanism. For example, an energy absorption mechanism may be secured to the inner column tube such that it slides with the tube and is locked to the housing via a cam driven by the tilt lever. Clamping of the inner column tube may be due to application of force from the tilt bracket (e.g., from outward projecting walls of the tilt bracket) in the absence of force from an intermediate column housing. Though the teachings herein may reference to a secondary impact events as occasioning certain of the functional aspects of the teachings, the teachings are not solely limited to secondary impact events. Rather, where reference is made to secondary impact, unless otherwise qualified, the teachings should be regarded as contemplating other impacts or conditions in which a threshold load (e.g., in a forward facing direction in a vehicle) is encountered that substantially exceeds a normal operational load and where a breakaway event may be desirable for substantially reducing load that otherwise would be transferred to a vehicle operator.

Any numerical values recited herein include e from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. A collapsing steering column assembly comprising:
    a) a steering shaft support structure;
    b) a steering shaft that is supported for rotation at least in part by the steering shaft support structure and having a longitudinal axis;
    c) a bracket for at least partially carrying the steering shaft support structure and attaching the assembly within a vehicle, wherein the bracket includes a pair of generally opposing downwardly oriented walls that flank at least a portion of the steering shaft support structure:
    d) a securing member for fixing a secure engagement position of the steering shaft support structure relative to the bracket; and
    e) a breakaway structure associated with the bracket, the securing member, or both;
        wherein the securing member is configured relative to the breakaway structure in a manner such that in an event of an impact exceeding a threshold load, at least a portion of the securing member breaks away from the secure engagement position by way of the breakaway structure and allows at least the portion of the steering shaft support structure, at least the portion of the securing member that breaks away, or both to translate forward;
        wherein the breakaway structure includes at least one breakaway insert that is operatively attached with at least one of the downwardly oriented walls when the steering shaft support structure is in the secure engagement position; and
        wherein one or both of the downwardly oriented walls includes a forward facing cut-out to recieve the at least one breakaway insert, and wherein the at least one breakaway insert has a length and includes a tapered portion that tapers from a forward portion toward a rearward portion and has an elongated slot adapted to receive the securing member.

2. The assembly of claim 1, wherein the steering shaft support structure includes an inner column tube and a column housing, wherein the inner column tube is configured for telescoping insertion within the column housing.

3. The assembly of claim 2, wherein the securing member applies a clamping force for securing the column housing to the inner column tube by way of a lever.

4. The assembly of claim 1, wherein the assembly includes a manually operated steering wheel adjustment subassembly adapted for:
    a) selectively adjusting the steering shaft in a fore or aft direction generally a the longitudinal axis;
    selectively raising or lowering the steering shaft; or
    c) both a) and b);
        wherein the steering wheel adjustment subassembly includes a lever for manually actuating the steering wheel adjustment subassembly, at least one engagement member that is brought to and out of engagement with the steering shaft support structure for selectively locking the steering shaft into a position desired by a user, the at least one breakaway insert that detachably mounts the steering wheel adjustment subassembly relative to the bracket, and a fastener assembly that operatively connects the lever, the at least one engagement member and the at least one breakaway insert.

5. The assembly of claim 1, wherein an energy absorption device is adapted to be carried at least partially by the support structure and employed for absorbing energy by way of plastic deformation of the energy absorption device during the forward translation of at least a portion of the steering shaft support structure, at least the portion of the securing member that breaks away, or both.

6. The assembly of claim 1, wherein the steering shaft support structure is pivotally mounted at a forward end of the steering shaft support structure within automotive vehicle.

7. The assembly of claim 1, wherein the securing member includes a tilt bolt, and in the event of the impact exceeding the threshold load, the tilt bolt breaks away from the secure engagement position and translates forward.

8. The assembly of claim 1, steering shaft supports a steering wheel.

9. The assembly of claim 1, wherein the securing member is at least partially surrounded by a spacer.

10. The assembly of claim 1 wherein the forward facing cut-out is generally c-shaped to receive the at least one breakaway insert; and
    wherein during normal operation the tapered portion of the at least one breakaway insert contacts an opposing surface of the bracket and the dimensions of or both of a taper of the tapered portion or the opposing surface are such that as the impact occurs, the at least one breakaway insert is able to detach from the steering shaft support structure to allow at least the portion of the steering shaft support structure, at least the portion of the securing member that breaks away, or both to translate forward.

11. The assembly of claim 1, wherein the securing member is an elongated member.

12. The assembly of claim 1, wherein the assembly includes a longitudinally slotted plate stop device attached to the steering shaft support structure.

13. The assembly of claim 12, wherein the longitudinally slotted plate stop device includes at least one transversely extending flange on one or more opposing side walls and an upper longitudinal slot adapted to receive at least one engagement member for selectively locking the steering shaft into a position desired by a user.

14. A collapsing steering column assembly comprising:
a) a steering shaft support structure;
b) a steering shaft that is supported for rotation at least in part by the steering shaft support structure and having a longitudinal axis;
c) a bracket for at least partially carrying the steering shaft support structure and attaching the assembly within a vehicle;
d) a securing member for fixing a secure engagement position of the steering shaft support structure relative to the bracket; and
e) a breakaway structure associated with the bracket, the securing member, or both;
wherein the securing member is configured relative to the breakaway structure in a manner such that in an event of an impact exceeding a threshold load, at least a portion of the securing member breaks away from the secure engagement position by way of the breakaway structure and allows at least a portion of the steering shaft support structure, at least the portion of the securing member that breaks away, or both to translate forward;
wherein the assembly includes a longitudinally slotted plate stop device attached to at least the portion of the steering shaft support structure; and
wherein the longitudinally slotted plate to device includes one or more base portions at each of a forward end and rearward end portions and opposing side walls that project upward from the one or more base portions and include longitudinally extending side slots adapted to receive the securing member.

15. The assembly of claim 14, the longitudinally slotted plate stop device includes at least one transversely extending flange on the one or more opposing side walls and an upper longitudinal slot adapted to receive at least one engagement member for selectively locking the steering shaft into a position desired by user.

16. The assembly of claim 14, wherein the bracket includes a pair of generally opposing downwardly oriented walls that flank at least the portion of the steering shaft support structure; and
wherein the breakaway structure includes at least one breakaway insert that is operatively attached with at least one of the downwardly oriented walls when the steering shaft support structure is in the secure engagement position.

17. The assembly of claim 16, wherein one or both of the downwardly oriented wails includes a forward facing cutout to receive the at least one breakaway insert, and wherein the at least one breakaway insert has a length and includes a tapered portion that tapers from a forward portion toward a rearward portion and has an elongated slot adapted to receive the securing member.

18. A collapsing steering column assembly comprising:
a) a steering shaft support structure;
b) a steering shaft that is supported for rotation at least in part by the steering shaft support structure and having a longitudinal axis;
c) a bracket for at least partially carrying the steering shaft support structure and attaching the assembly within a vehicle;
d) a securing member for fixing a secure engagement position of the steering shaft support structure relative to the bracket; and
e) a breakaway structure associated with the bracket, the securing member, or both;
wherein the securing member is configured relative to the breakaway structure in a manner such that in an event of an impact exceeding a threshold load, at least a portion of the securing member breaks away from the secure engagement position by way of the breakaway structure and allows at least a portion of the steering shaft support structure, at least the portion of the securing member that breaks away, or both to translate forward;
wherein the securing member is at least partially surrounded by a spacer; and
wherein the spacer is a hollow, generally cylindrical spacer that has a first portion adapted to oppose an energy absorption device of the assembly and allow for sliding engagement with the energy absorption device during the impact: a second portion that includes one or more projections adapted to be received within the bracket, the steering shaft support structure, or both, and that will shear during the impact to allow the securing member to translate forward.

19. The assembly of claim 18, wherein the bracket includes a pair of generally opposing downwardly oriented walls that flank at least a portion of the steering shaft support structure: and
wherein the breakaway structure includes at least one breakaway insert that is operatively attached with at least one of the downwardly oriented walls when the steering shaft support structure is in the secure engagement position.

20. The assembly of claim 19, in one or both of the downwardly oriented walls includes a forward facing cutout to receive the at least one breakaway insert, and wherein the at least one breakaway insert has a length and includes a tapered portion that tapers from a forward portion toward a rearward portion and has an elongated slot adapted to receive the securing member.

* * * * *